Patented Oct. 23, 1951

2,571,998

UNITED STATES PATENT OFFICE 2,571,998

METHOD AND APPARATUS FOR DETECTING FLAWS IN RAIL OR THE LIKE

Walter C. Barnes, Lake Bluff, and Henry W. Keevil, Evanston, Ill.

Application October 30, 1946, Serial No. 706,596

21 Claims. (Cl. 175—183)

This application is a continuation-in-part of our prior application, Serial No. 538,818, filed June 5, 1944, now Patent No. 2,461,252, and the entire disclosure of that application is incorporated herein by reference.

The detection of latent flaws, and particularly transverse fissures in railroad track, is an important part of railroad operation, because the timely removal of defective rails can avoid wrecks that are costly to both life and property.

The present invention pertains to apparatus adapted to locate these hidden flaws, so that the rails in which they are found may be promptly removed and replaced with sound rail.

The detecting apparatus is usually mounted on a car, called a "detector car," and as the car is moved along the track, the hidden flaws are automatically recorded and their location indicated on the rail by a daub of paint. One method used for this purpose is known as the "residual magnetism method," and it consists of magnetizing the rail successively with a plurality of magnets and then searching the rail for characteristic residual magnetic fields found in the vicinity of fissures. Detector coils are used to indicate these fields and the weak impulses generated by the coils are suitably amplified to operate recording equipment and to automatically apply a daub of paint at the place on the rail that produced the indication.

The present invention relates particularly to the amplifier used for expanding the weak impulses generated by the detector coil or coils as different magnetic fields adjacent to the rail are traversed. The invention is not limited to use with the residual magnetic system of flaw detection, although it is particularly advantageous when used with that system, especially when fed by detector coils of special construction and arrangement.

One problem encountered in the use of rail flaw detecting equipment is to distinguish between the magnetic fields caused by transverse fissures and other such internal discontinuities and those caused by burns, gags, flowed rail, etc. Another problem is to be able to detect fissures closely adjacent to joint bars, switch points and frogs, where experience has shown that fissures frequently occur. It is even desirable to locate fissures within the area bounded by the joint bars, and my invention enables this difficult feat to be accomplished along with the detection of flaws close to the ends of the joint bars and close to switch points, frogs, etc., and also permits differentiation between the impulses produced by fissures and those produced by superficial defects in the rail.

Broadly stated, it is the object of this invention to improve the detection of flaws in rail by the use of an improved amplifier, and to preferably use such amplifier with one or more detector coils constructed and arranged so as to feed impulses of a selected nature into such amplifier.

Further and other objects and advantages will become apparent as the description proceeds and the description is read in conjunction with the accompanying drawings, in which.

A preferred form of the invention has been disclosed in the drawings and will be hereinafter described, together with an explanation of what are believed to be the technical reasons for the superior performance of the amplifier when used in conjunction with flaw detection equipment, but it should be understood that the choice of this particular embodiment of the invention is for the purpose of complying with Section 4888 of the Revised Statutes, and should not be interpreted as restricting the scope of the appended claims, except as may be required by the prior art.

Broad principles involved

It is not possible to determine definitely the exact reasons for the superior performance of the amplifier disclosed in this application, but there are certain broad principles which underlie the present invention and these have been verified by oscillographs of the wave forms as the impulses delivered to the amplifier pass through the various sections of the amplifier.

The electrical impulse generated in detector coils as they traverse a rail joint is many times greater than that produced when the coils pass over the magnetic field in the vicinity of a fissure. The magnetic disturbance at a rail joint starts at or adjacent one end of the joint bar and continues throughout the length of the joint bar, reaching a sharp peak at the point of separation of the abutting or adjacent ends of the rails connected by the joint bar. If a fissure is located on the near side of a joint bar (i. e., considered in light of the direction of travel), it is not too difficult to detect such fissure with the residual magnetic system, but if it is located on the far side of the joint bar, it has been found that the intensity of the joint bar indication and rail joint indication is such as to temporarily paralyze the amplifier so that it is not able to respond to fissures located closely adjacent the far end of the joint bar. One of the most salient features of the present amplifier is that it prevents rail joints from blocking out fissure indications received immediately after the joint has been traversed, and it has been found that with this amplifier, fissures located closely adjacent to the far end of the joint bar, or even located within the joint bar but on the far side of the rail joint, could be easily detected.

This is accomplished by reducing the strong joint indications to a point where they are comparable in magnitude with fissure indications, and by maintaining the frequency range of the transmitted joint signal within a range corresponding roughly to the frequency of the incoming joint signal.

At the same time weaker fissure impulses as compared with impulses produced at the rail joint are amplified and changed in character to cause them to more surely operate the recording apparatus. Preferably this is done by causing the fissure impulse (originating signal) to generate a secondary wave in the amplifier, which derivative secondary wave, either alone or in conjunction with the original fissure impulse, is used to operate the recorder.

The amplifier is also constructed so that impulses produced by burns, corrugations and other like superficial defects in the rail are reduced in magnitude to a point where they will ordinarily not operate the recorder. It is believed that such indications are a composite of many impulses, a large number of which are high frequency, so that by filtering out the high frequency components of such impulses, the magnitude of the impulses as a whole is brought down to a point where it ordinarily would not operate the recorder.

For most satisfactory operation, detector coils of the type, size and spacing shown in our copending application, Serial No. 538,818, hereinbefore-mentioned and incorporated by reference, are used to produce the signal that is transmitted to the amplifier. However, a single detector coil may be used as may also other arrangements of multiple coils and still retain many of the advantages inherent in the amplifier itself.

Figure 2:
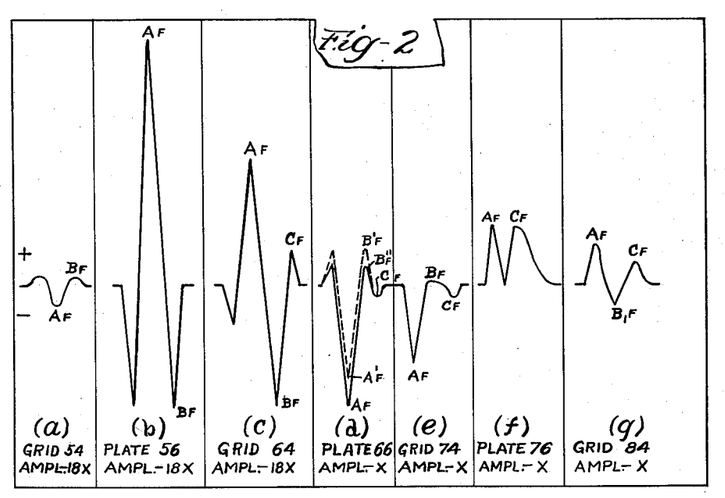
Fig. 2 is a composite view showing the approximate wave shape of a typical fissure signal at successive points in the amplifier shown in Fig. 1, the fissure being approximately 40% of the rail head.

As shown in our prior application, Serial No. 538,818, and as illustrated by the wave form on the control grid of the first tube (see Fig. 2 (a)), the double pickup having two coils of reverse polarity, with the center cores substantially abutting, produces an originating impulse upon passing over a magnetized fissure which consists of two full waves, but because of the spacing and the reverse polarity of the coils these waves overlap, causing the center two halves to form a single negative half wave whose magnitude is substantially twice that of the adjacent single half waves of opposite polarity. This characteristic wave form is also produced when the pickup passes over a magnetized joint (see Fig. 3 (a)), but in the latter case the magnitude of the wave is many times greater than that of the fissure. It should be noted that the scale of wave $A_f$ in Fig. 2 is not the same as wave $A_j$ of Fig. 3, the relative amplitude being indicated in the drawings with the factor $x$ being taken as unity. It has also been found that the signal wave form for a surface burn and certain other types of surface defects is substantially the same in general character as for a fissure indication, although the magnitude may vary to some extent, and intermingled with such waves are high frequency variations produced as a result of the irregular spread-out magnetic poles produced by such surface defects.

Thus, an amplifier to produce the desired results must be such as will take advantage of the foregoing differences in wave forms of fissures, joints, bars, corrugations, etc., and use these differences to produce the desired results. To amplify the strongest portion of the fissure signal which is shown as the downward swing of the first tube (see Fig. 2 (a)), each successive stage of amplification must be of a different order and character because of the fact that the swing of the plate current of a tube with response to an incoming signal is of opposite polarity to that of the incoming signal on the grid, and thus the signal will be passed to the next succeeding tube in reversed polarity.

Figure 3:
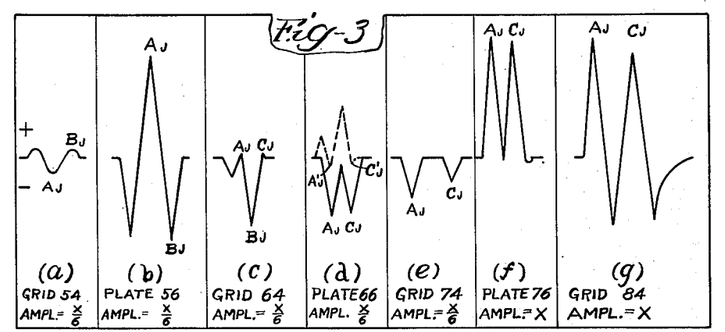
Fig. 3 is a composite view illustrating the approximate wave shape of a signal produced at a rail joint as it passes through the amplifier.

While the amplifier must use tubes so biased as to cause each successive stage to amplify the desired portion or portions of the fissure signal, it must also operate each amplification stage in such manner that a much stronger signal of the same polarity such as the $A_j$ swing of a joint signal (see Fig. 3 (a)) will be amplified to a lesser extent or even reduced.

At the same time it is desirable that portions of waves of opposite polarity be eliminated, if they are not to be used to operate the recorder, as for example the B swing shown on the grids of the first and second tubes, for they will serve no useful purpose in actuating the recorder, and, if they are of sufficient strength, they may contribute to saturating the amplifier and blocking signals which it is desired to have recorded, and which may be following closely behind the undesired signals as they enter the amplifier.

It is also important for the amplifier to have means for blocking and filtering out very high frequency variations which may be picked up alone or as components of other signals, but such means must not operate to suppress or block out the somewhat lower frequency fissure waves. By tuning the recording relay as by using a relay of selected impedance and with a condenser of selected capacity connected across its coil, the relay may be made to respond only to signals of the desired frequency or lower.

Another principle used in the present amplifier to assist in selectively differentiating fissures from other superficial rail defects and to strengthen the fissure wave while suppressing the impulses received from burns, rail joints, etc., involves the creation of a secondary wave of the same polarity as that of the original fissure wave used for recording and of substantially the same magnitude and frequency. Such secondary wave when it reaches the recording relay at minute intervals of time after the original wave has reached the relay will assist in the operation of the relay to assure recording.

In one sense, the amplifier of the invention serves to distort incoming waves, rendering them more nearly alike in amplitude without however substantially affecting their frequencies.

*Amplifier per se*

Figure 1:
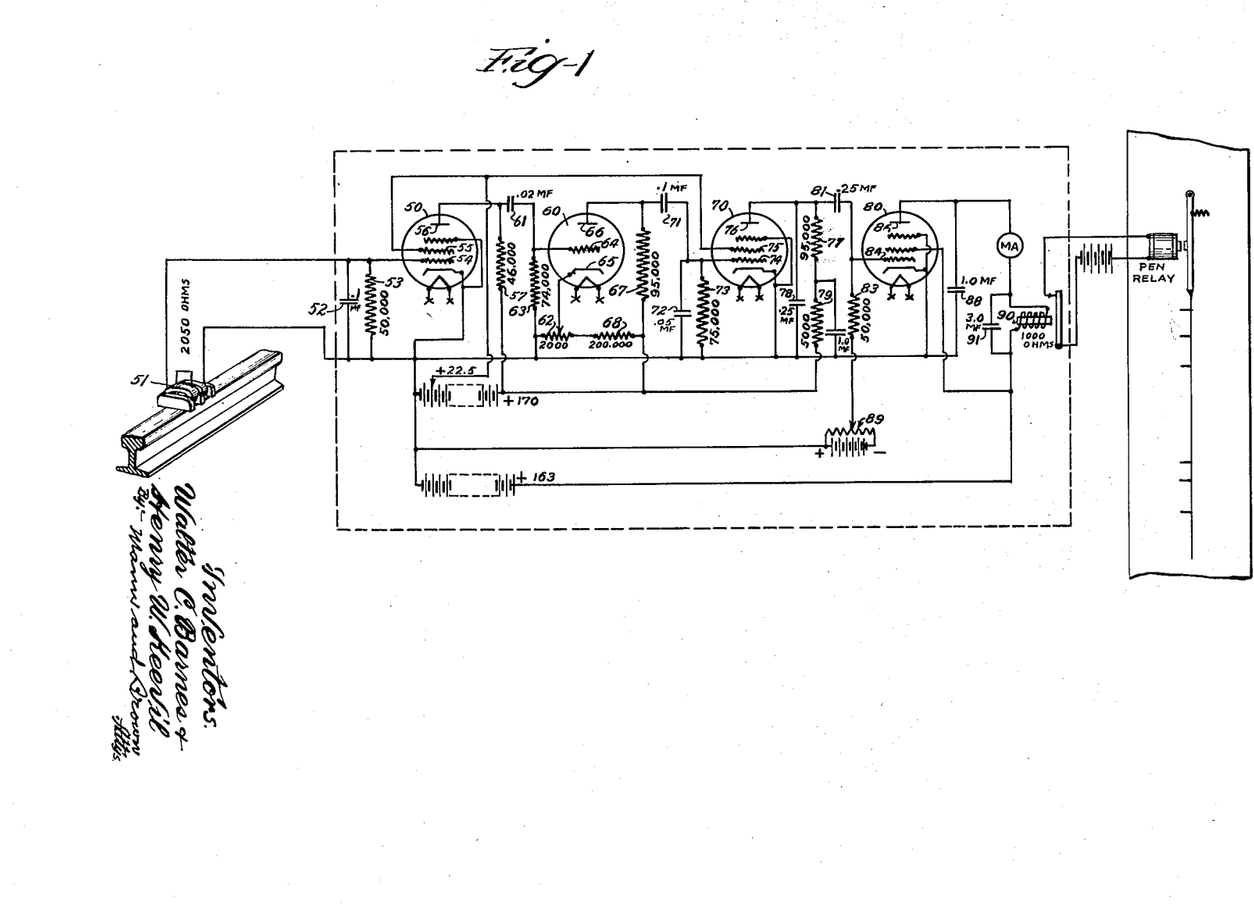
Fig. 1 is a schematic diagram showing an amplifier constructed in accordance with the teachings of this invention.

The amplifier shown in Fig. 1 has four stages of amplification as indicated by the tubes 50, 60, 70 and 80. Preferably, tube 50 is a 6K7 tube, tube 60 is a 6K5 tube, tube 70 is a 6K7 tube, and tube 80 is a 6F6 tube. It should be understood, however, that this specific disclosure of a particular amplifier and the preferred values of its component parts as referred to in the specification and drawings is merely illustrative.

Figure 4:
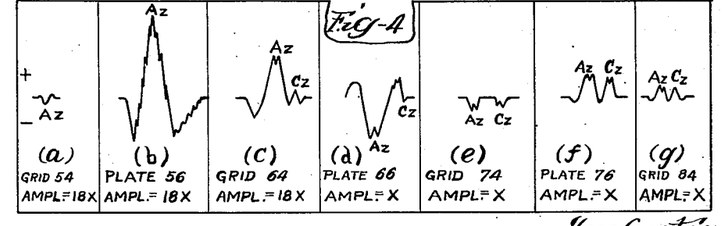
Fig. 4 is a composite view making a similar showing of the wave form of a typical burn as it progresses through the amplifier.

The input side of the amplifier is connected to a pickup 51 which preferably is a double coil pickup of the type disclosed in our application, Serial No. 482,526, now abandoned, and it is connected so that the double magnitude half wave is impressed on the grid 54 of tube 50 as a negative half wave, as shown in Figs. 2, 3 and 4. A condenser 52 connected across the input side of the amplifier and in parallel with the pickup 51 operates to filter out some of the high frequency wave variations received as a part of signals generated by the pickup 51. Such high frequency variation is characteristic of the signals produced by magnetized burns and corrugations, and because such superficial defects do not affect the safety of train operation, it is desirable not to have them recorded on the recording mechanism.

Figure 5:
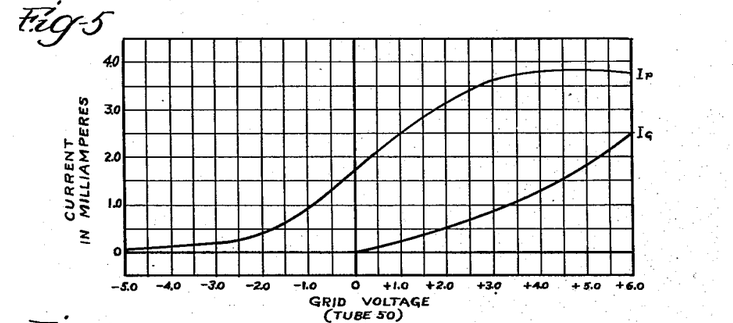
Fig. 5 is a chart showing the tube characteristics for the first tube of the amplifier.

A grid bias 53 in parallel with the resistance of the pickup 51 adjusts the bias of grid 54 so that it is operating comparatively close to zero value, in this case approximately .01 negative volt. A load resistor 57 is employed of such value that with this grid bias, the voltage on the plate 56 is approximately 102 volts. Figure 5 shows the tube characteristics for tube 50, and it will be seen that with this tube, a relatively small negative grid signal will be amplified to a considerable extent, but a strong negative signal on the grid will bring the tube operation to the lower part of the curve in Figure 5 where it begins to level off with the result that such signal will be amplified to a considerably lesser extent. Since it is the signals that are weakly negative when received from the pickup that are to be amplified and recorded, or secondary waves created by such weakly negative signals, tube 50 begins the process of discriminating between relatively weak signals and those of a much greater magnitude.

It should be noted that the scales used for indicating the fissure waves in Figs. 2, 3 and 4 are not identical (the variations in amplitude of waves have been indicated on the drawings), so that the incoming signals produced by a joint are approximately 100 times the magnitude of signals produced by burns, corrugations, or by large fissures.

The signals that are positive on the grid 54 of tube 50 will be amplified to approximately the same degree as will the weaker negative signals at the same point, but because the 22.5 positive voltage on the screen grid 55 of tube 50 is relatively low, for this particular tube, the tube will to some extent act as a limiter to restrict the maximum wave passed to the next tube, both for positive and negative input waves. Furthermore, a strong positive input wave will start a flow of grid current, as shown in Figure 5, which will tend to neutralize the input wave and lower the effective output from the tube.

The actual effect of this operation is illustrated by reference to the relative amplification by tube 50 of a fissure signal (Fig. 2) and of a much stronger signal as from a joint, as shown in Fig. 3, it being borne in mind again that the scales of the two figures are unequal, with the joint wave which is actually one hundred times or more as great in magnitude as the fissure wave being shown reduced by the scale of the drawing to the same size as a fissure wave. It will be noted that between grid 54 and plate 56 the half wave designated $A_f$ is amplified about twelve times in the case of the fissure wave (Fig. 2), while for the much stronger signal $A_j$ received from the joint (Fig. 3), the amplification is only about five times. Thus, tube 50 serves to limit the amplification of the stronger joint signal with respect to the amplification of the weaker fissure signal. The operation of the first tube, therefore, may be said to be characterized by being biased so that it will operate fairly close to zero grid voltage so that the tube will amplify as much as possible the negative half waves which are to be used for actuating the recorder and as little as possible the positive half waves which are to be discarded; while the large voltage waves, such as produced by rail joint of either polarity, will be amplified to a lesser extent when they are sufficiently strong to bring the grid operation out on either end of the amplification curve (Fig. 5) where the tube gain is substantially less. This restrained amplification of the larger voltage waves is supplemented in operation by using a relatively low screen grid voltage which enables this tube to operate as a limiter in the amount of plate voltage variations that will be passed to the next tube.

Figure 6:
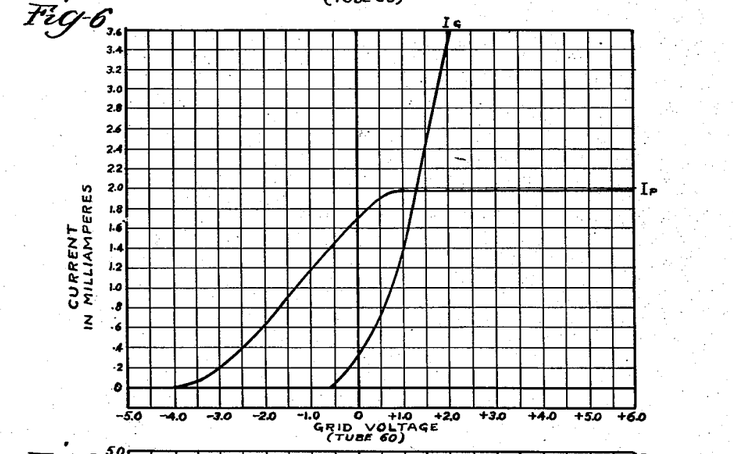
Fig. 6 is a chart showing the tube characteristics for the second tube of the amplifier.

The positive signal from tube 50 is then passed through a condenser 61 to the grid 64 of the tube 60 in the second stage of amplification. Preferably, this condenser has a relatively small capacitance, say on the order of .02 microfarads, to transmit the signals without substantially changing their frequencies. The tube 60, a 6K5 tube, is termed a sharp-cut-off tube because of its relatively short and abrupt amplification range as illustrated in Fig. 6. The grid 64 is biased by a resistor 63 and the bias in respect to the cathode 65 may be adjusted by movement of the potentiometer 62. Movement of the potentiometer 62 will vary the bias on the grid 64 from approximately −2.3 volts to approximately −0.1 volt, the usual working range being from about −1.2 volts to about −2.2 volts. The plate resistor (load) 67 is of such value that the voltage on the plate 66 will vary from 63 to 147 volts depending upon the setting of the grid bias. By referring to Fig. 6 which shows the tube characteristics for tube 60 (6K5), it will be seen that the more nearly the bias is set to zero, the less tendency there will be for a strong positive signal to be amplified. If the signal is such as to produce more than +1.0 positive voltage on the grid 64, all portions of the wave of higher voltage will be completely cut off having gone beyond the saturation point of the tube. Since it is the weaker $A_f$ half wave (positive) of Fig. 2 rather than the stronger $A_j$ wave (positive) of Fig. 3 that it is desired should be passed to the next stage of amplification, the potentiometer 62 is usually adjusted so that a weak positive signal is passed and amplified, as shown in Fig. 2 to a greater extent than is a stronger positive signal, as shown in Fig. 3, a settting of negative grid voltage at 2.0 volts being satisfactory for this purpose.

The condenser 61, which is interposed between the plate 56 of the first tube and grid 64 of the second tube, has the effect coupled with other factors of setting up a secondary wave, as shown at $C_f$ on grid 64 of Fig. 2 after the primary wave has passed through the tube, and this condenser should be of such a value that the wave length of the secondary wave will be approximately equal to that of the primary wave. A condenser having a capacity of .02 microfarad is satisfactory for this purpose. The secondary wave $C_f$ is amplified in tube 60 and appears along with the $A_f$ wave on the plate 66 of this tube. It will be noted in Fig. 3 that the $A_j$ wave shown on grid 64 is considerably less than that shown on the plate 56. This is due to the large positive wave $A_j$ being impressed on grid 64 which causes that grid to become positive and to start taking electrons from the cathode 65, which electrons tend to neutralize the positive polarity shown on the grid and reduce the wave fed to that grid from the plate 56. How rapidly this grid current begins to flow as the grid swings positive is indicated by Fig. 6. Actually the $A_j$ wave shown in Fig. 3 (c) on grid 64 is still larger than a similar wave $A_f$ shown on this grid in Fig. 2 (c) because of the differences in scales for the two figures. The $C_j$ wave in Fig. 3 (c) (i. e. the secondary wave) is produced on the grid 64 by the action of condenser 61, as explained above. The $A_j$ and $C_j$ waves are amplified by tube 60 to produce the waves shown on plate 66 (Fig. 3 (d)). The $B_j$ wave has been substantially cut off and does not appear on the small scale diagram of Fig. 3 (d) because it is so strong that it goes below the negative cut off point of the tube below which point no negative signal will be passed.

If the grid bias on grid 64 is adjusted by the potentiometer 62 to a point very near a zero value, namely, —0.1 volt, the strong positive wave $A_j$ (Fig. 3) caused by a joint will be reduced by the flow of grid current to a point where it will appear on the plate 66 at a magnitude actually less than the wave appearing there from a smaller incoming wave, such as a fissure indication. This situation is shown in Fig. 3 (d) in dotted lines as an alternative wave $A'_j$ on plate 66. Likewise, the change in the fissure wave on the plate 66 when the grid bias is shifted to nearly zero, is shown in dotted lines in Fig. 2 (d). In other words, by properly adjusting the grid bias on the tube 60, it is possible to have the tube transmit a stronger wave from a fissure indication than from a joint indication, even though the joint wave was many times larger than the fissure wave when it was impressed upon the grid of that tube. This selectiveness on the part of the second tube of the amplifier in amplifying fissure waves but suppressing joint waves does not mitigate the amplifier's ability to detect large fissures because the difference between the fissure wave for a 40% fissure, which is one illustrated in Fig. 2, and a still larger fissure is slight as compared with the difference between the impulse received from such 40% fissure and a joint, the latter being on the order of approximately 100 to 1 ratio.

This characteristic action of the second tube of the amplifier is brought about by the fact that a strong positive wave will bring the tube operation up to the flat portion of the amplification curve (the saturation point) in Fig. 6 and beyond which no signal is passed at all. At the same setting of the potentiometer 62 a wave of such lesser magnitude as the $A_f$ portion of the fissure wave in Fig. 2 will not go beyond the saturation point and thus will be amplified through the tube. Thus, this potentiometer adjustment will allow the elimination of joint signals, because it will reduce them to such an extent that they are not strong enough to operate the recorder, while at the same time the adjustment is sufficient to retain signals of the same polarity but of smaller original magnitude, such as a fissure indication, and cause them to operate the recorder.

The action of the second tube of the amplifier may be summarized as follows:

Since the desired signal coming from the first stage of amplification is now a positive half wave, the second stage of amplification should be a tube of such nature and so biased that a weak positive signal will be amplified while a strong positive signal will be amplified to a lesser extent, or even reduced in value. At the same time, this stage should reduce or eliminate the extraneous incoming negative signals which might, if strong enough, tend to saturate the amplifier. This is done by the use of a sharp cutoff tube at this stage of the amplifier with provision for selectively adjusting the grid bias in order that more or less of a relatively strong half wave may be passed as will be determined by the conditions under which the detecting apparatus is operating, but because of the sharp cutoff action of the tube, a strong positive signal will be passed with relatively less amplification than an incoming weaker positive signal even with the grid bias set at the negative end of the range of adjustment.

Figure 7:
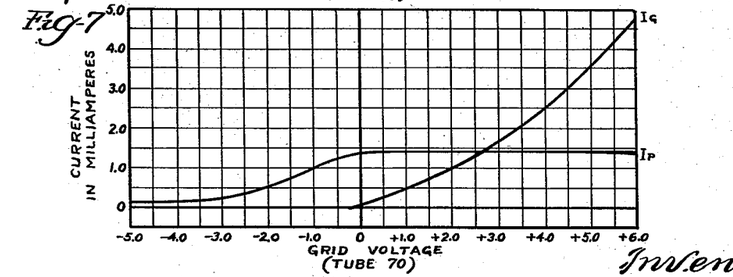
Fig. 7 is a chart showing the tube characteristics for the third tube of the amplifier.

The negative portions A and C of the signals passed by the second tube go through a low capacitance condenser 71 to the grid 74 of tube 70, the condenser 71 preferably having a capacitance on the order of 0.1 mf. The condenser 71 operating in conjunction with a by-pass condenser 72 tends to level out these signals, but the latter condenser may be omitted under some operating conditions for best results. The tube 70 (6K7) with approximately +15.2 volts on the plate 76 and +22.5 volts on the screen grid 75 will also act as a limiter, so that no matter what the magnitude of the incoming signal, the maximum outgoing signal will be limited to a relatively low value. This can be seen by comparison of a characteristic curve for tube 70, as shown in Fig. 7, with the curves for a similar tube such as shown in Fig. 5.

The tube 70 is biased with grid resistor 73 which provides a normal grid potential of approximately —0.47 volt. The plate load made up of resistors 77 and 79 is such that with this grid potential the voltage on plate 76 will be approximately 15.2 volts. On the plate side of the tube 70 a bypass condenser 78 is interposed to operate in a manner similar to condenser 52 for removing high frequency alternations which are particularly prevalent in burn and corrugation signals, the removal of which tend to reduce the effective strength of these signals to a point where they will not operate the recorder.

To summarize the action of the third tube; the desired fissure signal that is to be indicated on the recorder is now negative so that the third stage of the amplifier should be biased to pass negative waves and to a much lesser extent positive waves because in many instances (depending upon the setting of the grid bias control in the second stage) the negative signal produced by the joint signal is still of greater magnitude than the fissure signal. It is desirable to operate the tube 70 with low screen and plate voltages which will cause it to act as a limiter and pass the incoming signals more nearly at equal strength. The bypass condenser or filter 78 is also connected across the plate circuit to remove additional high frequency alternations which may be passed to this point.

The last stage of amplification is accomplished with a 6F6 tube, as indicated at 80. The positive signals from the plate 76, as shown in Figs. 2 and 3, are passed through a coupling condenser 81 to the grid 84 of this tube, and the grid is biased through a resistor 83 and a potentiometer 89 to cause the tube to operate as a class B amplifier. Preferably, the bias on the grid is −23.9 volts and the voltage on the plate is +16.3 volts.

The portions A and C of the signal are passed from the grid 84 to the plate 86 in amplified form and are used to operate a relay 90 which actuates a pen or other marker which records on a moving tape. The relay 90 is tuned to operate at different strengths of indications and frequencies by means of a condenser 91 and by suitably giving the relay the desired impedance. Thus the relay will not be actuated upon receiving signals of a freqency higher than that to which it is tuned by the condenser in parallel with it, but will operate upon receipt of signals of a lower frequency providing the magnitude of such signals is sufficiently high. The condenser 88 is also preferably provided in the plate circuit to assist in removing undesirable high frequency alternations.

In general, the fourth stage of amplification is merely the conventional class B amplifier for amplifying positive impulses of a given polarity received from the third stage of amplification. The condenser 88 in the plate circuit takes out undesirable high frequency alternations, and further selection of the desired impulses for recording is accomplished by the tuned relay which operates only when it receives waves of a predetermined magnitude and duration.

If it is desired to amplify and record one or more positive portions of an incoming wave, similar steps would be taken, choosing appropriate values for the various components of the circuit to produce like results.

Thus each amplification stage carries out the objective of:

(1) Increasing the amplitude of a signal of the polarity such as is to be used for recording and is of the approximate magnitude as that of a fissure wave, (2) Decreasing the magnitude of signals of a similar polarity, but whose original magnitude is many times greater than that produced by a fissure, (3) Reducing and eliminating signals of an opposite polarity, (4) Taking out the high frequency variations characteristic of some of the signals other than those produced by the magnetized fissures, (5) Making use of a secondary wave to supplement the action of the primary wave in actuating the recorder, and (6) Keeping the frequency range of transmitted signals within a range corresponding roughly to the frequency of the incoming signal, thus preventing low frequency signals from developing which would operate to saturate the amplifier and block other signals following within a brief time interval.

*Practical results effected*

To illustrate the manner in which the amplifier disclosed in Fig. 1 is effective in locating more fissures in track, the results of laboratory tests on this amplifier will be set forth.

The tests were conducted on a rail comprising four separate rail lengths 100, 101, 102 and 103 connected together by joint bars 104, 105 and 106, respectively. The track as thus composed included a known 45% fissure indicated at X located between the ends of the joint bar 104, a known 20% fissure indicated at Y located approximately two inches beyond the end of the joint bar 105 in rail 102, and a large burn indicated at Z in the rail 102 between the joint bars 105 and 106. The pickup used in the test consisted of two pairs of coils, each pair being connected in series opposition and being adapted to run along the longitudinal center line of the rail as shown at 51 in Fig. 1. These coils are substantially as shown and described in our prior application, Serial No. 538,818. The first pair of coils was connected to an amplifier which corresponded in construction to the one disclosed in our prior application, Serial No. 538,818, and which is known as the No. 34 amplifier. The second pair of coils was connected to the amplifier disclosed in Fig. 1 of this application known as the No. 45 amplifier, and the recording pens were arranged to do side-by-side indications so that a comparison between the two channels could be observed. The recording pens were relay-operated.

Figure 8:
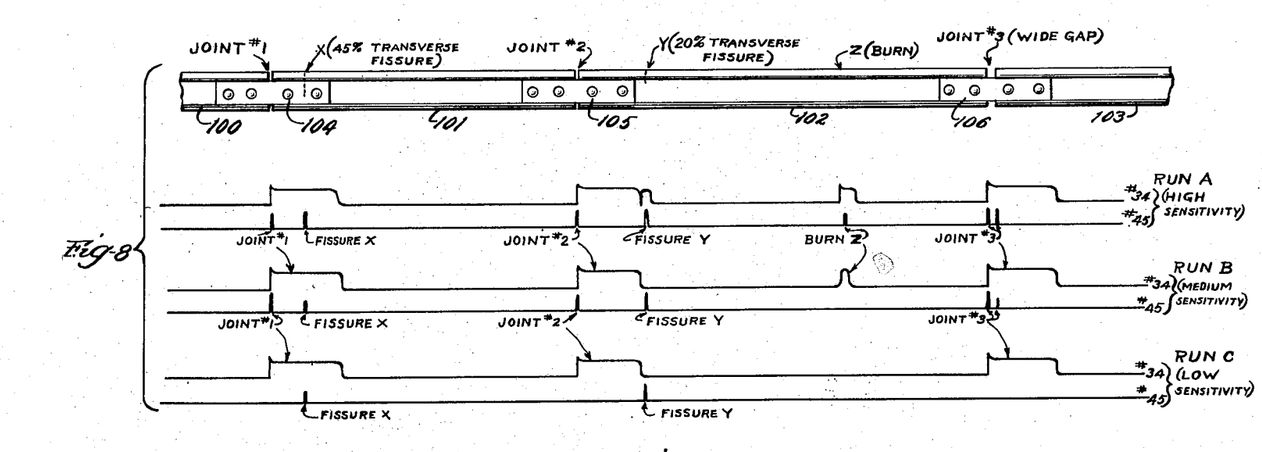
Fig. 8 is a composite view showing a test rail and a reproduction of the record tape actually produced when testing a preferred form of amplifier in comparison with an alternate form, the record tape illustrating the results produced with different settings of the amplifiers for sensitivity.

The amazing thing about the test was that the record produced by the No. 34 amplifier consistently showed a broad indication at joints 1, 2 and 3 with fissure X being completely obscured by by the joint signal, fissure Y being ordinarily not discernible, and the burn Z being strongly indicated. This is shown in Fig. 8 (run B) using normal amplifier sensitivity.

Using normal operating sensitivity for the No. 45 amplifier, the record produced by this amplifier shows a single line indication for joints 1 and 2, and a double indication for joint 3 (wide joint) and a similar indication for fissures X and Y, but the burn Z was not recorded at all under normal adjustments of the amplifier. In other words, the joint indications were changed from broad indications which obscured fissure X to a single line indication that made fissure X easy to identify and also made fissure Y clearly discernible. The amazing thing is that the burn did not record at all, although it obviously was strongly magnetized as revealed by the indications produced with the No. 34 amplifier. Cutting down the sensitivity of the No. 34 amplifier, the indication for fissure Y disappeared before the burn indication Z, but cutting down the sensitivity of the No. 45 amplifier produced the astounding result of having the joint indications disappear before the fissure indications as shown in run C, Fig. 8.

Upon increasing the sensitivity of the No. 45 amplifier to an abnormally large amount, the burn Z could be brought in to some extent, but the amplifier could be set within a wide range of settings without bringing in the burn, and while still indicating the two fissures clearly.

*Secondary wave-effect*

It will be noted by referring to Fig. 2 that in recording the fissure wave as it leaves the amplifier, the relay 90 receives two impulses in quick succession which cause it to operate and these impulses correspond to the components A and C, as shown in Fig. 2 (g). These components are of the same polarity and it will be noted that the component C is a secondary wave or has no corresponding part in the originating signal, as shown in Fig. 2 (a), it being a derivative of the originating signal produced by the capacitance, resistance and inductance of the circuit, as hereinbefore described. The component C has a reinforcing effect upon the component A and the relay 91 is tuned to respond to the quickly successive loops A and C as they leave the amplifier.

In a similar manner the amplifier disclosed in our prior application, Serial No. 538,818, which has been incorporated herein by reference, makes use of a secondary wave, but in this instance it is a secondary wave which alone is depended upon for actuating the recording.

Figure 9:
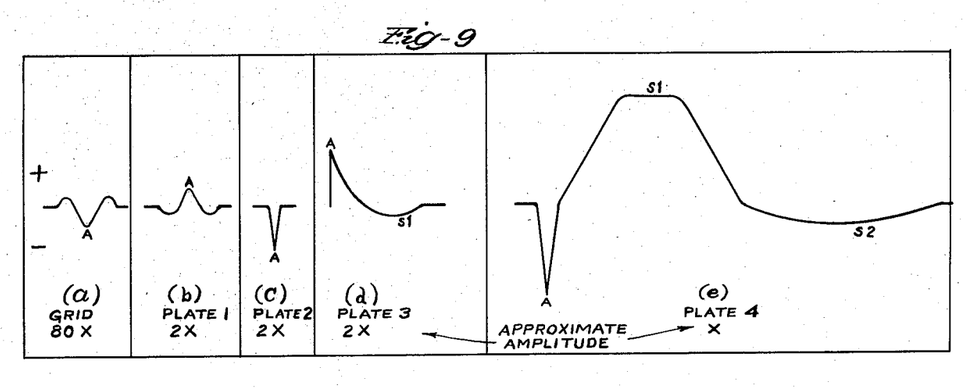
Fig. 9 is a composite view showing the manner in which the amplifier disclosed in Fig. 14 of our prior application, hereinbefore-identified, produces a secondary wave which is used to actuate the recorder.

This is illustrated in Fig. 9 which shows the wave formed at successive stages of a No. 34 amplifier, such as disclosed in our prior application, Serial No. 538,818. The wave at the grid of the first tube with the negative voltage being shown downwardly and the positive voltage upwardly consists of a reinforced loop A (see Fig. 9 (a)) which at the plate of the first tube is inverted, as shown in Fig. 9 (b). The second tube cuts off that portion of the wave which is of opposite polarity to the loop A, as shown in Fig. 9 (c), but amplifies the component A of the wave.

At the plate of the third tube the main wave is very peaked, as shown in Fig. 9 (d), and gained very little in voltage, but the secondary wave indicated at S1 begins to show up. It is of low voltage but substantially longer in duration than the main wave A.

At the plate of the fourth tube, the main wave is amplified in voltage, as shown in Fig. 9 (e), but is of very short time duration. The secondary wave S1 has been amplified until it is even higher in voltage than the main wave and may be nine times or more as long as the main wave A. There is also a third wave which is set up in the fourth tube, as indicated at S2, this wave being of opposite polarity from the secondary wave S1 but of the some polarity as the primary wave A.

In the five-tube amplifier shown in our prior application, Serial No. 538,818, it is the secondary wave S1 that is used to operate the recording relay, and the main fissure wave A and the secondary wave S2 are not utilized.

By using the broad secondary wave S1, the pen relays are given time to act and the result is a broad base indication which is somewhat typical of fissures and which experience has taught car operators to look for in discriminating between true fissure indications and those caused by superficial rail defects.

We claim:

1. An apparatus for detecting flaws in rail which includes an inductive pickup moved relative to the rail, an amplifier fed by the inductive pickup and a recorder operated by the amplifier, the combination in said amplifier of at least two stages of amplification, one of which is characterized by having a steep amplification curve with a sharp cut-off at least at one end thereof and with a grid bias set so that the signals transmitted through the tube are distorted to reduce the relative strength of signals substantially matching in amplitude those received from rail joints as compared to signals of substantially smaller amplitude which characterize signals received from fissures.

2. An apparatus for detecting flaws in rail which includes an inductive pickup moved relative to the rail, an amplifier fed by the inductive pickup and a recorder operated by the amplifier, the combination in said amplifier of at least two stages of amplification, one of which is characterized by a steep grid current curve whereby signals which cause the grid potential to substantially exceed the values at which grid current starts to flow will be substantially reduced in amplitude relative to signals that do not substantially exceed such values.

3. An apparatus for detecting flaws in rail which includes an inductive pickup moved relative to the rail, an amplifier fed by the inductive pickup and a recorder operated by the amplifier, the combination in said amplifier of a stage characterized by having a sharp cutoff whereby signals which cause the grid potential to substantially exceed the values at which grid current starts to flow will be substantially reduced in amplitude relative to signals that do not substantially exceed such values, and a subsequent stage constructed and arranged to act as a limiter and tending to render all signals which pass therethrough of substantially equal strength.

4. An apparatus for detecting flaws in rail which includes an inductive pickup moved relative to the rail, an amplifier fed by the inductive pickup and a recorder operated by the amplifier, the combination in said amplifier of a stage characterized by having a sharp cutoff whereby signals which cause the grid potential to substantially exceed the values at which grid current starts to flow will be substantially reduced in amplitude relative to signals that do not substantially exceed such values, a subsequent stage constructed and arranged to act as a limiter and tending to render all signals which pass therethrough of substantially equal strength, and a stage acting as a class B amplifier.

5. An apparatus for detecting flaws in rail which includes an inductive pickup moved relative to the rail, an amplifier fed by the inductive pickup and a recorder operated by the amplifier, the combination in said amplifier of at least two stages of amplification, one of which is characterized by a steep grid current curve whereby signals which cause the grid potential to substantially exceed the values at which grid current starts to flow will be substantially reduced in amplitude relative to signals that do not substantially exceed such values, and means for selectively biasing the grid on said stage whereby the limiting action of the steep grid current curve may be selectively utilized.

6. An apparatus for detecting flaws in rail which includes an inductive pickup moved relative to the rail, an amplifier fed by the amplifier, the combination in said amplifier of a stage characterized by having a sharp cutoff whereby signals which cause the grid potential to substantially exceed the values at which grid current starts to flow will be substantially reduced in amplitude relative to signals that do not substantially exceed such values, a subsequent stage constructed and arranged to act as a limiter tending to render all signals which pass therethrough of substantially equal strength, means for causing transmitted signals to pass through the amplifier without substantial lowering of their frequencies, and a relay tuned to operate within the range of frequencies desired to be recorded.

7. The method of amplifying impulses received from a rail flaw inductive pickup to differentiate between true fissures and inconsequential surface defects and to prevent impulses received from rail joints from obscuring fissure indications, which consists in amplifying and/or distorting signals received from the pickup to produce transmitted signals which do not exceed in amplitude a given value and which are of frequencies corresponding substantially to the originating signals, removing high frequency variations from said signals, and eliminating from the remaining signals those which are below a given strength and those having a frequency falling outside a selected band of frequencies.

8. The method of detecting flaws in rail which consists in setting up characteristic magnetic fields in the vicinity of fissures, passing an inductive pickup over the rail to be tested, sending the impulses received from the pickup as it traverses said characteristic magnetic fields through an amplifier to amplify said impulses, setting up in the amplifier a secondary wave as a derivative of the impulse received when the pickup passes through said magnetic field, and then utilizing said secondary wave in operating a recorder.

9. The method of detecting flaws in rail which consists in setting up characteristic magnetic fields in the vicinity of fissures, passing an inductive pickup over the rail to be tested, sending the impulses received from the pickup as it traverses said characteristic magnetic fields through an amplifier to amplify said impulses, setting up in the amplifier a secondary wave as a derivative of the impulse received when the pickup passes through said magnetic field, and then utilizing said secondary wave in conjunction with a transmitted component of the primary fissure impulse for operating the recorder.

10. The method of detecting flaws in rail which consists in setting up characteristic magnetic fields in the vicinity of fissures, passing an inductive pickup over the rail to be tested, sending the impulses received from the pickup as it traverses said characteristic magnetic fields through an amplifier to amplify said impulses, setting up in the amplifier a secondary wave as a derivative of the impulse received when the pickup passes through said magnetic field, and then utilizing said secondary wave to the exclusion of the original fissure impulse for operating the recorder.

11. The method of detecting flaws in rails which consists in setting up characteristic magnetic fields in the vicinity of fissures, passing an inductive pickup over the rail to be tested, sending the impulses received from the pickup as it traverses said characteristic magnetic field through an amplifier to amplify said impulses, causing the impulses transmitted through the amplifier to operate a recorder provided they are above a minimum strength, setting up in the amplifier a secondary wave as a derivative of the impulse received from said magnetic field and having approximately the same frequency as said impulse, utilizing said secondary wave in conjunction with a transmitted component of the primary fissure wave for operating said recorder, and tuning the recorder so that it will not operate in response to a frequency substantially above that of said primary and secondary waves.

12. The method of detecting flaws in rail which consists in setting up magnetic fields in the vicinity of fissures and other rail defects, passing an inductive pickup over the rail to be tested, sending the impulses received from the pickup as it traverses said magnetic fields through an amplifier to amplify said impulses, setting up in the amplifier a secondary wave as a derivative of the impulse received when the pickup passes through said magnetic field, filtering out high frequency variations in the transmitted components of impulses passing through the amplifier to reduce their amplitude, and utilizing said secondary wave in conjunction with the primary fissure wave for operating a recorder.

13. Flaw detection apparatus including recording means, a pickup unit adapted to be relatively moved longitudinally along a body to be tested, having therein a pair of coils connected in series opposition and with a longitudinally disposed core in each coil and with said cores having a pole adjacent to the body to be tested at either end of each of said coils and the center two of said poles substantially in contact with each other, an amplifier which substantially will pass portions of signals of only one polarity, said pickup being connected to the input of said amplifier and said recording means being connected to the output of said amplifier, the stages of amplification of said amplifier being so biased and loaded that weak incoming signals will be amplified in amplitude while relatively stronger incoming signals will be passed at substantially the same amplitude as the weak incoming signals.

14. Flaw detection apparatus including recording means, a pickup unit adapted to be relatively moved longitudinally along a body to be tested, having therein a pair of coils connected in series opposition and with a longitudinally disposed core in each coil and with said cores having a pole adjacent to the body to be tested at either end of each of said coils and the center two of said poles substantially in contact with each other, an amplifier which substantially will pass portions of signals of only one polarity and which will set up a secondary wave of the same polarity, and of substantially the same wave length as that of the signal produced by the magnetized fissure, said pickup being connected to the input of said amplifier, the stages of amplification of said amplifier being so biased and loaded that weak incoming signals will be amplified in amplitude while relatively stronger incoming signals will be passed at substantially the same amplitude as the weak incoming signals, a relay in the plate circuit of the last tube of said amplifier tuned to respond to impulses of the approximate frequency of the signals produced by the magnetized fissure, said recording means being actuated by said relay, said amplifier having at least one bypass condenser to filter out frequency variations of a higher frequency than that of the signals produced by the said magnetized fissure.

15. The method of operating an amplifier for use with flaw detection apparatus which consists in passing portions of signals of one polarity, and setting up a secondary wave of the same polarity for supplementing the action of the primary wave.

16. The method of amplifying signals for use in conjunction with flaw detection apparatus which consists in amplifying and transmitting one polarity of said signal, and setting up a secondary wave of the same polarity for operating a recorder.

17. The method of differentially amplifying, for use in operating a recorder, fissure and other signals set up by an inductive pickup that has moved over a longitudinally magnetized rail which consists in increasing the amplitude of a signal of the polarity such as is to be used for recording and is of the approximate magnitude as that of a fissure wave, decreasing the magnitude of signals of a similar polarity but whose original magnitude is many times greater than that produced by a fissure, and reducing and substantially eliminating signals of an opposite polarity.

18. The method of differentially amplifying, for use in operating a recorder, fissure and other signals set up by an inductive pickup that has moved over a longitudinaly magnetized rail which consists in increasing the amplitude of a signal of the polarity such as is to be used for recording and is of the approximate magnitude as that of a fissure wave, decreasing the magnitude of signals of a similar polarity but whose original magnitude is many times greater than that produced by a fissure, reducing and substantially eliminating signals of an opposite polarity, and keeping the frequency range of transmitted signals within a range corresponding roughly to the frequency of the incoming signal thus preventing low frequency signals from developing which might operate to saturate the amplifier and block other signals following within a brief time interval.

19. The method of differentially amplifying, for use in operating a recorder, fissure and other signals set up by an inductive pickup that has moved over a longitudinally magnetized rail which consists in increasing the amplitude of a signal of the polarity such as is to be used for recording and is of the approximate magnitude as that of a fissure wave, decreasing the magnitude of signals of a similar polarity but whose original magnitude is many times greater than that produced by a fissure, reducing and substantially eliminating signals of an opposite polarity, and substantially removing high frequency variations of non-fissure signals.

20. The method of differentially amplifying, for use in operating a recorder, fissure and other signals set up by an inductive pickup that has moved over a longitudinally magnetized rail which consists in increasing the amplitude of a signal of the polarity such as is to be used for recording and is of the approximate magnitude as that of a fissure wave, decreasing the magnitude of signals of a similar polarity but whose original magnitude is many times greater than that produced by a fissure, reducing and substantially eliminating signals of an opposite polarity, and setting up a secondary wave to supplement the action of the primary wave in actuating the recorder.

21. In apparatus for detecting flaws in rail after the rail has been longitudinally magnetized thereby to set up characteristic magnetic fields in the vicinity of rail defects, the combination of a pair of induction coils connected in opposition and of such length and spacing therebetween as to cause fissure defects in the rail to set up voltage waves, the center half waves of which are in substantial phase relation forming a prime wave, while corresponding wave portions of non-fissure defects are less substantially in phase relation forming a composite wave of normally smaller amplitude than said prime wave, and an amplifier for amplifying the output from said coils, means associated with the amplifier for selectively dissipating impulses having a frequency as high as approximately 60 cycles per second, means also associated with the amplifier for amplifying and extending all remaining impulses of the same polarity above said voltage level to a degree sufficient to actuate recorder apparatus, and recording apparatus actuated by the output of said amplifier.

WALTER C. BARNES.
HENRY W. KEEVIL.

REFERENCES CITED

The following references are of record in the file of this patent:

UNITED STATES PATENTS

| Number | Name | Date |
|---|---|---|
| 2,061,979 | Perry | Nov. 24, 1936 |
| 2,109,455 | Barnes et al. | Mar. 1, 1938 |
| 2,113,785 | Drake et al. | Apr. 12, 1938 |
| 2,133,687 | Drake | Oct. 18, 1938 |